Aug. 13, 1957 Y. PONSAR 2,802,363
APPARATUS RESPONSIVE TO VARIATIONS IN THE DIFFERENTIAL
BETWEEN THE LEVELS OF TWO LIQUID BODIES
Filed Oct. 19, 1951 4 Sheets-Sheet 1
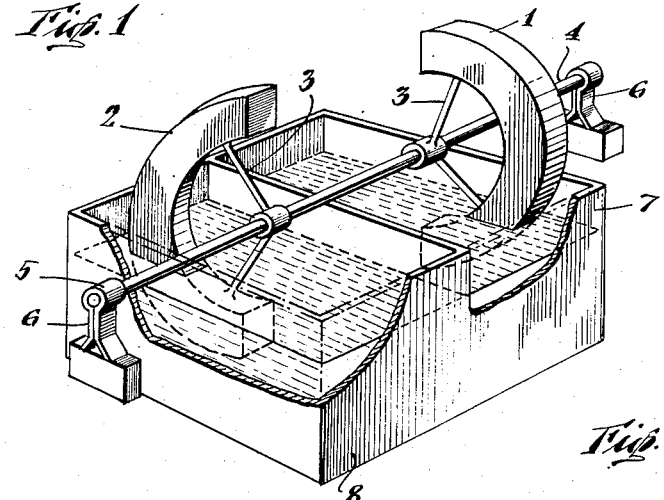
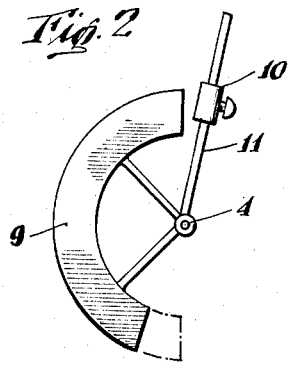
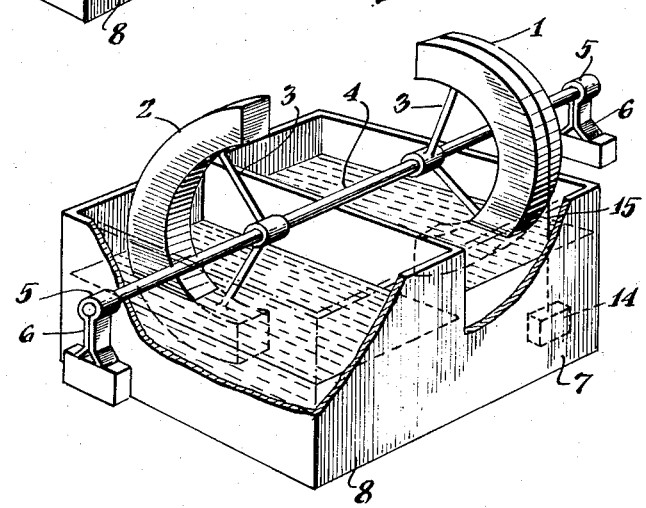
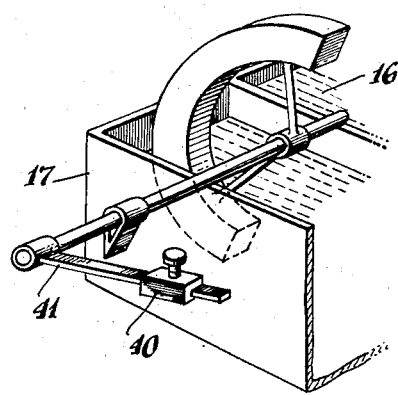
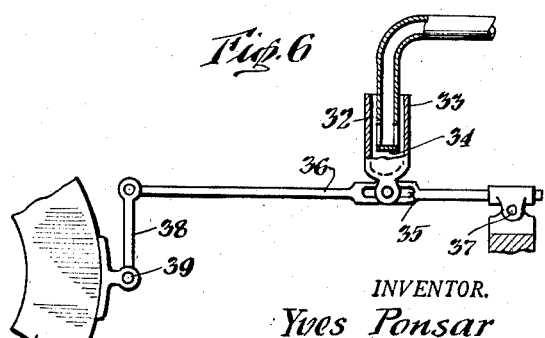
INVENTOR.
Yves Ponsar
BY
ATTORNEY Aug. 13, 1957   Y. PONSAR   2,802,363
APPARATUS RESPONSIVE TO VARIATIONS IN THE DIFFERENTIAL
BETWEEN THE LEVELS OF TWO LIQUID BODIES
Filed Oct. 19, 1951   4 Sheets-Sheet 2
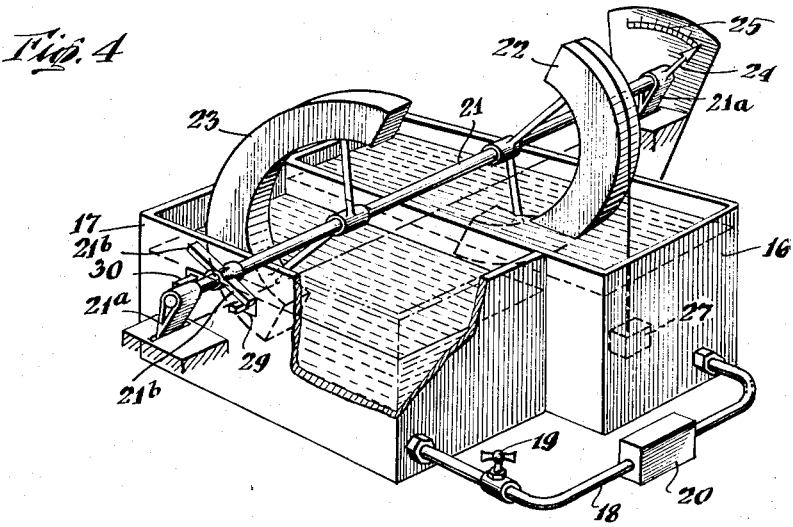
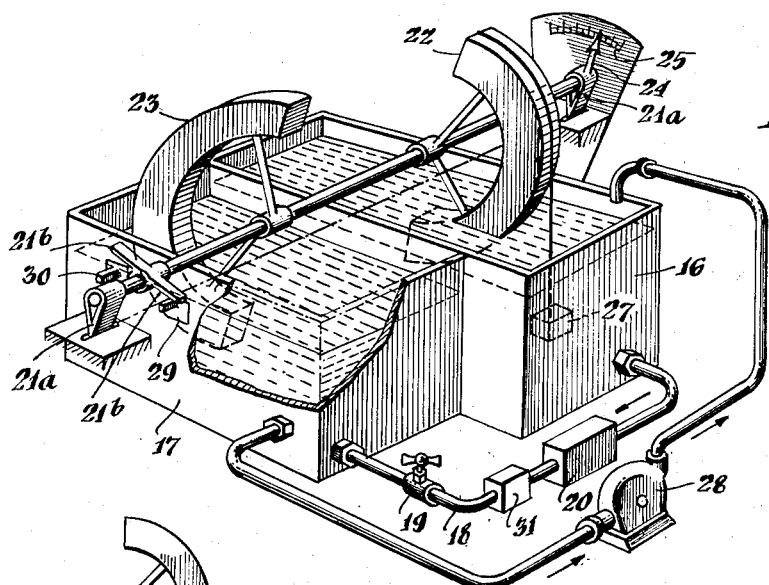
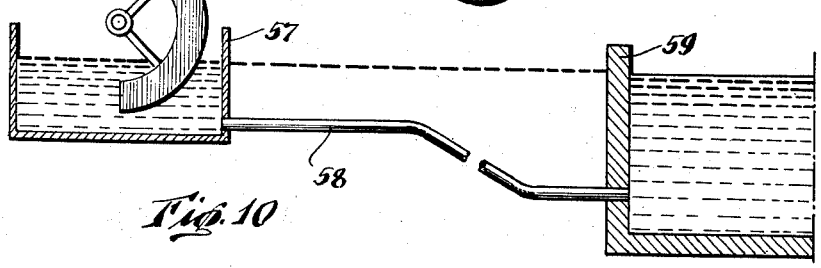
INVENTOR.
Yves Ponsar
BY
George H. Corey
ATTORNEY

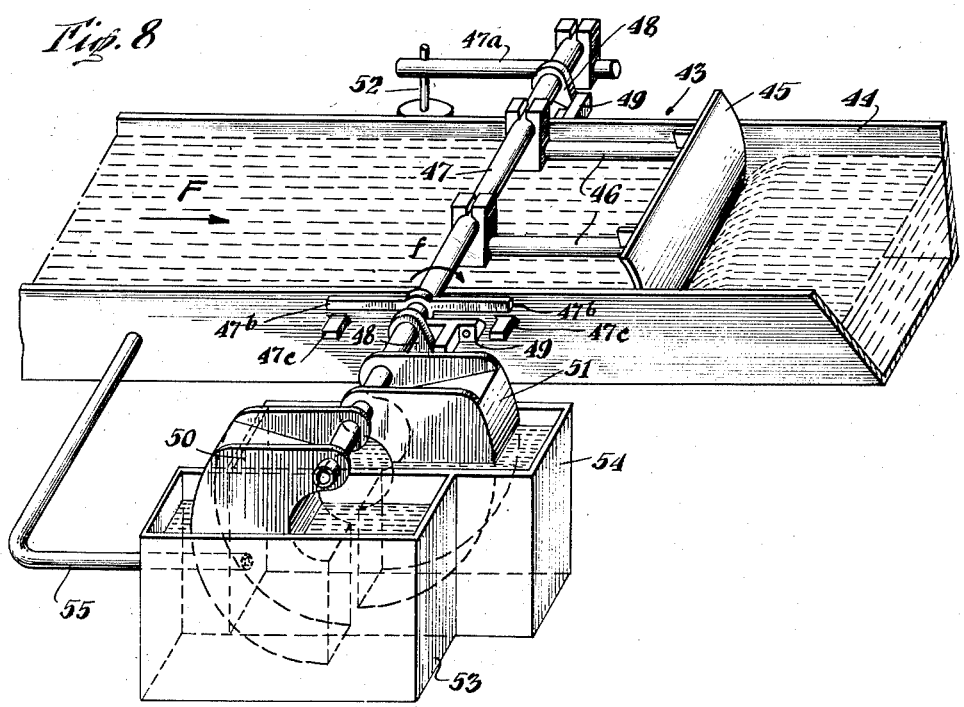
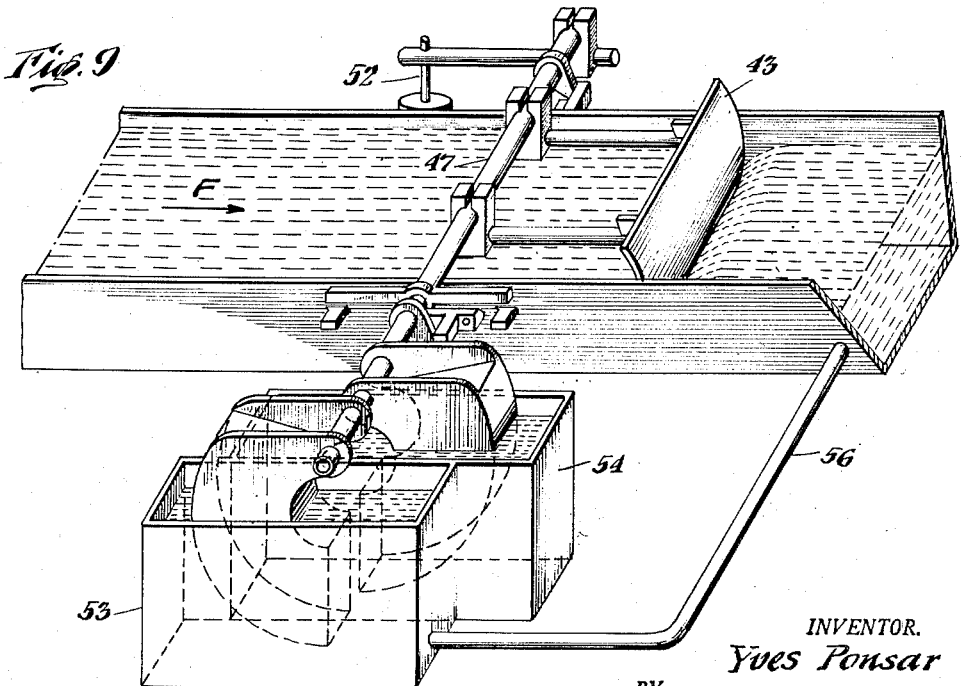

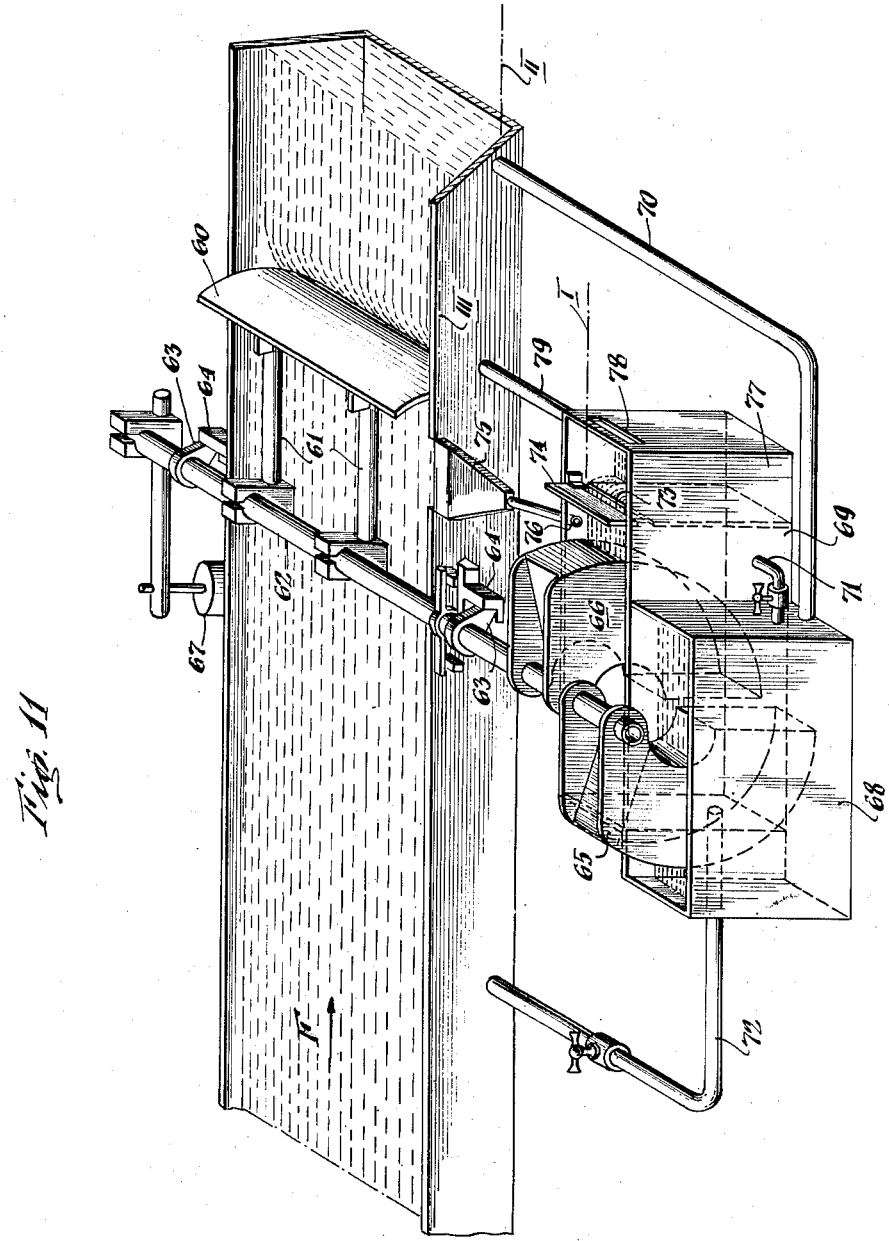

United States Patent Office 2,802,363
Patented Aug. 13, 1957

2,802,363

APPARATUS RESPONSIVE TO VARIATIONS IN THE DIFFERENTIAL BETWEEN THE LEVELS OF TWO LIQUID BODIES

Yves Ponsar, Bois-Colombes, France, assignor to Etablissements Neyrpic, Grenoble, France, a corporation of France Application October 19, 1951, Serial No. 252,057

Claims priority, application France October 27, 1950

23 Claims. (Cl. 73—432)

The present invention relates to apparatus for measuring or regulating hydraulic quantities. It is particularly concerned with apparatus responsive to the difference between two liquid levels, and for producing regulating or indicating effects in response to such a difference in levels. This apparatus is also applicable to the measurement of levels, flows, liquid viscosities, etc., to the calibration of apparatus such as diaphragms, venturis, or analogous devices, and to the regulation of flows or liquid levels in hydraulic installations, for example, open canals such as irrigation ditches.

An object of the invention is to provide improved apparatus for producing a mechanical movement varying in response to the difference of two liquid levels.

Another object is to provide improved apparatus for controlling a liquid level to maintain it in a predetermined relation with respect to another liquid level.

Another object is to provide improved apparatus for measuring a hydraulic quantity which varies as a function of the difference between two liquid levels.

The required measurement or regulation is accomplished by providing two different liquid levels, hereinafter termed the pilot level and the motor level, and utilizing the difference of those levels to operate a movable assembly connected to suitable indicating or control apparatus.

The movable assembly mentioned above may comprise two hollow float members which if placed together would form complementary halves of a solid of revolution such as a cylinder or torus. The two liquid levels may be provided in adjacent tanks and the two hollow float members are then partially submerged in the respective tanks. The two float members are connected so as to be spaced along their axis of revolution while retaining the same relative orientation with respect to that axis which they would have when placed together to form said solid of revolution. The float members are mounted for rotation as a unit about that axis, which is hereinafter termed the axis of oscillation. In apparatus so constructed, two opposed moments act about the said axis of oscillation. The two moments are determined by the respective volumes of liquid displaced by the float members on the opposite sides of a vertical plane passing through the axis. Additional moments may in some cases be applied to the apparatus.

The apparatus just described, and mechanically equivalent structures, will produce a mechanical movement which very sensitively reflects the difference between the two liquid levels. Such an apparatus may be used to operate a load device such as a measuring element (e. g., a pointer moving over a scale) or a regulating element (e. g., a valve or gate controlling the flow through a conduit).

Various modifications of this apparatus will now be described by way of example with refrence to the accompanying drawings, in which Fig. 1 is a schematic perspective view of one form of apparatus constructed in accordance with the invention.

Fig. 2 illustrates a modification of a portion of the apparatus of Fig. 1.

Fig. 3 is a view similar to Fig. 1 showing a modified form of apparatus.

Fig. 4 represents an application of apparatus constructed in accordance with the invention to the measurement of a liquid flow or viscosity, or to the calibration of a diaphragm, venturi, etc.

Fig. 5 illustrates a modification of the apparatus of Fig. 4.

Fig. 6 is a fragmentary view of another modification.

Fig. 7 is a fragmentary view of apparatus constructed in accordance with the invention to indicate a difference in liquid levels.

Fig. 8 shows a pivoted gate operated by apparatus constructed in accordance with the invention and controlling the flow through a canal so as to maintain a constant level upstream from the gate.

Fig. 9 illustrates a pivoted gate operated by a modified form of the invention, which regulates the flow to maintain a constant level downstream from the gate.

Fig. 10 is a schematic view of a modification of Fig. 8 or Fig. 9 in which the regulated flow is maintained at a value determined by another level.

Fig. 11 illustrates a modified form of canal gate operating mechanism constructed in accordance with the invention, in which the gate is operated to maintain the downstream level constant only as long as the upstream level is between predetermined upper and lower limits.

The apparatus of Fig. 1 includes a movable assembly formed by two partially immersed float members or float elements 1 and 2 rigidly connected by arms 3 to a horizontal rod 4 which is mounted at its ends in journals 5 on fixed supports 6. The float members 1 and 2 constitute two separated complementary parts of one solid of revolution symmetrical about the axis of oscillation of the apparatus, which axis is here located within the rod 4. The center of gravity of the moving parts is situated at the axis of oscillation. The float members 1 and 2 are immersed in two separate tanks 7 and 8, containing liquid.

The displacement of those portions of the float members 1 and 2 on the right hand side of a vertical plane passing through the axis of oscillation produce a counterclockwise moment on the assembly. The displacement of those portions of the float elements 1 and 2 on the left hand side of said plane produce a clockwise moment on the assembly. If the liquid level is at the same elevation in the tanks 7 and 8, then regardless of the absolute elevation of that level, the opposed moments are balanced and the assembly is in stable equilibrium, whatever its angular position, the assembly being substantially equivalent to a single solid of revolution rotatable about its axis and partially submerged in a liquid.

Considering now the effect of a variation in level, two different modes of operation are possible and must be separately considered. In the first mode of operation, the two float elements 1 and 2 each have a horizontal cross-sectional area much smaller than that of their respective tanks, so that the variation in displacement of each float element has only a negligible effect upon the liquid level in its associated tank. The same mode of operation occurs where each level is independently controlled by means external to the oscillating assembly, so that it is not affected by rotation of the assembly. In the second mode of operation, at least one of the two float elements has a horizontal cross-sectional area which is a substantial fraction of the cross-sectional area of its tank, so that the variation in displacement of the float element as it rotates produces a substantial variation in the level in the tank.

Referring to the first mode of operation described above, if the level in tank 8 falls below the level in tank 7, then the clockwise torque becomes less than the counterclockwise torque and the assembly turns counterclockwise.

As the turning movement progresses, the clockwise moment is unaffected by the movement, because the volumn of the immersed portion of float member 2 to the left of a vertical plane through the axis of rotation, which is the portion effective to produce the clockwise moment, remains constant. That portion of the lower end of float 2 which moves to the right of that vertical plane becomes effective to produce a counter-clockwise moment on the assembly. This increase in the counter-clockwise moment produced by float 2 is, however, balanced by a corresponding decrease in the counter-clockwise moment produced by float 1 as the lower end of the latter float moves upwardly. Consequently, the change in angular position of the assembly has no effect on the unbalance of the moments produced by the lowering of the level in tank 8, until the end of float 2 starts to move above the liquid level in tank 8. At that point a new phase of movement begins, in which the decrease in the counterclockwise torque due to decreasing immersion of float 1 is no longer balanced by an equivalent increase in immersion of float 2. If not stopped by external means, this phase of movement continues until the float element 1 has turned far enough to be lifted out of the water in tank 7. At that time, both opposing torques are determined by the water level in tank 8, and consequently both are equal and the assembly is balanced. Similarly, if the water level in tank 8 increases above that in tank 7, the assembly rotates clockwise until float element 2 is lifted free of the liquid in tank 8.

If one float member is lifted free of the liquid in its associated tank, the assembly loses its sensitivity to that level and cannot regain it unaided. It is therefore necessary, in most practical applications, to provide stops which limit the range of travel so that neither float can be lifted free of the level in its tank, as long as those levels remain within a selected range.

From the foregoing, it may be seen that when the levels follow the first mode of operation described above, the assembly oscillates with an "all or nothing" characteristic, i. e., if the levels in the two tanks become different, the assembly moves to one end or the other of its range of travel, depending upon which level is greater.

Referring to the second mode of operation described above, if the level in tank 8 falls below the level in tank 7, the assembly turns counter-clockwise, but that motion increases the volume of float element 2 which is submerged in tank 8, which in turn raises the liquid level therein. The motion continues only until the increased displacement of float element 2 restores the level in tank 8 to its former value. If the motion of float element 1 is also effective to vary the level in tank 7, then the rebalancing effect is accentuated. If either or both of the levels are affected by the movement of the float elements, then the assembly turns through an angle which is a measure of the change in level that produced the rotation. This characteristic of the second mode of operation is in contrast to the "all or nothing" characteristic obtained with the first mode of operation, as described above.

Fig. 1 illustrates a simple form of apparatus embodying most of the essential features of my invention. This apparatus may be modified in several respects while retaining those essential features. For instance, the two tanks may be widely separated and at different elevations instead of being side by side, and the mechanism connecting the float members may assume various forms which may be extremely complex, as long as the two float members move concurrently. The two float members may be completely immersed instead of only partially immersed. If they are completely immersed, the second mode of operation outlined above cannot be obtained without additional apparatus, since the immersion is not varied nor is the level changed by rotation of the assembly. (See Fig. 7 for an example of such additional apparatus.)

The partial immersion of the float members may be reduced below that illustrated, subject to the limitation mentioned above, that both float members must remain partially immersed throughout the range of travel of the assembly.

In the arrangement of Fig. 1, the two float members have been shown as having the form of complementary halves of a solid of revolution. By the use of this form, the center of gravity of the assembly is on its axis of rotation, and the assembly is acted upon by two opposing moments whose difference is determined by the difference in levels and is independent of the angular position of the assembly, at least within the operating range of variation of that position.

Structures may be built with float members having forms different from those in Fig. 1, in which the same essential characteristics of the opposed moments are obtained by adding another moment-producing device to compensate for the difference between the moment-producing characteristic of the actual float member and the moment-producing characteristic of a float member having the ideal form, i. e., one-half of a solid of revolution. Such an arrangement is shown in Fig. 2.

In an apparatus constructed in accordance with the invention, for a given range of variation of the liquid levels and for a given range of variation of the angular position of the assembly, the assembly will have certain qualities which are characteristic of the invention, i. e., the difference in the moments produced by the two floats is determined only by the difference in levels and is independent of the angular position of the assembly, except as variations in the angular position may produce variations in said levels. In any given apparatus, these ranges of level variation and of angular position variation are determined by the physical dimensions of the floats and by the location of the axis of rotation of the assembly with respect to the liquid levels. Stops are provided, if necessary, to keep the assembly within that range of angular positions.

In the modification shown in Fig. 2, the float element 9 is not a complete half of a solid of revolution, but has had its lower end truncated. The complete half would have a contour such as that shown in dotted lines in the drawings. The clockwise torque which would be produced by the displacement of liquid by the cut-off part of the float element 9 is provided by a counterweight 10 fixed to the rod 4 by an arm 11. Either or both of the two float members may be modified in the manner illustrated in Fig. 2 or in any other equivalent manner, so long as the compensating counterweight or other structure produces a moment varying with the orientation of the assembly and corresponding in all positions of the assembly to the moment which would be produced by the displacement of the part which has been cut off from the body.

Instead of cutting off part of one float member, it is possible to add a portion of any desired form if a corresponding counterweight is also added. In such an arrangement, the counter-weight must be placed on the opposite side of the axis from that described. An arrangement of this type may be used to permit the placing of the two float members in alignment with each other, on the same side of the axis thereby allowing the two tanks to be aligned also.

There is shown in Fig. 3 an apparatus similar to that of Fig. 1, in which a supplementary constant moment is applied to the assembly. This moment is produced by counterweight 14 suspended on a cable 15 wound about the body 1. Alternatively, the cable 15 may be wound upon a suitable pulley fixed to the rod 4. The effect obtained is analogous to that of Fig. 1, but the assembly is in stable equilibrium, not when the levels are the same in the tanks 7 and 8, but when a predetermined difference in level exists between these tanks, which difference in level depends upon the magnitude of the constant supplementary moment. If the difference in level between the tanks 7 and 8 has a value greater or smaller than that predetermined difference, then the assembly operates in the same manner as that described in Fig. 1. For example, if the first mode of operation is used, the assembly moves to one end or the other of its range of travel when the difference between the levels departs from its predetermined value. If the second mode of operation is used, then the assembly turns so as to maintain the difference in levels at that predetermined value.

When the assembly including the two float elements is used with supplementary measuring, regulating or control apparatus, the influence of that apparatus may modify the operation of the assembly. In order to secure the normal mode of operation, it is possible in certain cases to provide a compensating moment produced, for example, by a counter-weight, and balancing the effect of the supplementary apparatus in all angular positions of the assembly. This is the case in most of the modifications which are described below by way of example and in which either an indicating pointer or a valve is connected to the assembly.

There is shown in Fig. 4 a device constructed in accordance with the invention for measuring an unknown quantity, which may, for example, be the viscosity of a liquid. This liquid is located in two tanks 16 and 17 which communicate through a conduit 18 provided with a valve 19 and an orifice 20 which restricts the passage of liquid through the conduit. The measuring apparatus is of the type shown in Fig. 3, but the rod 21 is mounted on knife edge bearings 21a. Two float elements 22 and 23 are mounted on rod 21 and respectively partly submerged in the tanks 16 and 17. These float elements are concentric with the axis connecting the knife edges of the bearings. A pointer 24 is mounted on the assembly and cooperates with a graduated scale 25. In place of the pointer 24 and scale 25, any other suitable indicating or recording apparatus may be used. The arrangement is such that the center of gravity of the rotating parts is located at the axis of rotation, namely, the straight line extending through the knife edges of the bearings. Rod 21 is provided with arms 21b which engage abutments 29 and 30 to limit the travel of the assembly.

A constant moment, produced by a counterweight 27 suspended on a cable wound about the float element 22, insures that the assembly will be in stable equilibrium for a certain difference between the liquid levels in the tanks 16 and 17. The relative cross-sectional areas of the float members 22 and 23 must be sufficiently large as compared to the respective cross-sectional areas of the tanks 16 and 17 so that the change in position of the float members effects a restoring variation of the liquid levels. The apparatus is then effective to maintain the established difference in the levels.

In order to measure the viscosity of the liquid, the valve 19 is closed, and the tanks 16 and 17 are filled so that the assembly is in equilibrium in the position where the pointer 24 is at zero on the scale 25. Upon opening the valve 19, liquid passes from the tank 16 through orifice 20 to the tank 17. Since the head producing the flow through the orifice is maintained constant by the rotation of the assembly, the assembly rotates at a certain speed which depends only upon the characteristics of the apparatus and the viscosity of the liquid. If the scale 25 has been calibrated in units of viscosity by the use of liquids having known viscosities, the apparatus permits a direct reading of the viscosity on the scale at the end of a fixed period of rotation of the assembly, for example, one or two minutes.

It should be understood that the apparatus illustrated in Fig. 4 may be used to measure the coefficient of flow or any other characteristic of an orifice, venturi or other element which may be connected in the conduit 18. A calibration of the apparatus analogous to that mentioned above permits the direct reading of the unknown quantity on the scale 25 at the end of a predetermined time. It should be noted that the speed of rotation of the movable parts indicates the rate of flow through the apparatus 20 placed in the conduit 18.

In the modification of Fig. 5, a pump 28 whose rate of flow may be, for example, slightly less than the rate of flow through the conduit 18, returns fluid from the tank 17 and to the tank 16, so as to partially compensate for the passage of liquid between the tanks 16 and 17. This apparatus retards the travel of the oscillating assembly and thereby increases the duration of the test period, which is a considerable advantage at low flows. However, when the pump is used, the speed of rotation of the pointer is no longer a measure of the flow passing through the conduit 18, but is rather a measure of the difference between the flow through conduit 18 and the flow through pump 28. If the latter were constant, the scale might be calibrated in terms of that difference. However, in the usual case, the pump cannot be depended on to produce a constant flow. One must therefore determine the flow in some other manner, for example, by placing a flow measuring device 31 of conventional type, in the conduit 18.

Fig. 6 shows a modification of the apparatus of Fig. 5, in which the movable assembly operates a valve located at the end of the pipe from which liquid from the pump is discharged into the tank 16. The valve 32, which may be of any suitable type, includes a sleeve 33 which encircles the end of the supply pipe and obstructs a variable part of the annular flow discharged from that pipe. A jet suppressing plate 34 is located within the sleeve 33. In the particular apparatus illustrated, the sleeve 33 is connected by a pin and slot connection 35 to a lever 36. The lever 36 is pivoted at 37 on a fixed support and is connected to a link 38 pivoted at 39 to the body 22. The assembly is in equilibrium for a given difference in level between the tanks, and positions the valve so as to maintain that difference between the two levels. The valve 32 will move so as to maintain the flow through the pump equal to the flow through conduit 18. If the flow through the pump increases disproportionately, then the level in tank 16 rises and the movable assembly operates valve 32 in a closing direction. If the flow through the pump decreases, the valve is moved in an opening direction. The pointer 24 therefore indicates the valve position on scale 25. If the pump characteristics are sufficiently constant, the valve position may serve as an indication of the rate of flow, and hence the scale may be calibrated directly in terms of that flow rate. This indication is obtained with high precision and high sensitivity.

There is shown in Fig. 7 an apparatus in accordance with the invention for reading directly a difference between two liquid levels. This apparatus is similar to that of Fig. 4, but the constant supplementary moment of that figure, due to a weight suspended on a cable wound about a pulley, is replaced by a moment which varies with the angular position of the assembly. This moment is produced by a counterweight 40 connected by an arm 41 to the assembly including the solid of revolution. Under these conditions, the oscillating assembly assumes a particular angular position, in which it is in equilibrium, for each particular value of the difference in levels between the tanks 16 and 17. By calibrating the scale directly, the difference in level may be read in centimeters or any other suitable units. The scale may alternately be calibrated in units of other characteristics such as pressure, whose variations may be made to correspond to those of the difference between the two levels.

The arrangement shown in Fig. 7 ensures the operation of the apparatus according to the second mode described above.

In Fig. 8, an apparatus constructed in accordance with the invention is arranged to operate a gate 43 in a canal which may, for example, be a part of an irrigation canal network of the usual type in which the level upstream from each gate is maintained at a substantially constant value. The gate 43 is located in a canal 44 and includes a cylindrical plate 45 connected by arms 46 to a horizontal shaft 47 carried at its ends by knife edge bearings 48 resting on supports 49.

Upon the shaft 47 are mounted two float elements 50 and 51 of the type previously described, but modified by being truncated at their upper uncovered ends, and concentric with the axis of oscillation of the apparatus. That axis is located in the straight line joining the points of contact of the knife edge bearings 48 on their supports 49 and is substantially below the shaft 47. A counterweight 52 is mounted on an arm 47a attached to shaft 47 to counterbalance the weight of the gate 43 and to compensate the assembly for the modification of the center of gravity produced by the upper truncation of the partially immersed float elements. In other words, the truncation of the float members lowers the center of gravity, but the counterweight 52 compensates, restoring the center of gravity substantially to the level of the axis of rotation of the assembly. The float members 50 and 51 are respectively partially submerged in tanks 53 and 54. The tank 54, referred to as the motor tank, is connected by conduit 55 to the canal 44 upstream from the gate. The direction of flow of the water is indicated by the arrow F in Fig. 8. The tank 53, termed the pilot tank, is filled with water to a certain elevation which is predetermined and may be regulated by any suitable means (not shown). The shaft 47 is provided with arms 47b which cooperate with abutments 47c to limit the travel of the oscillating assembly in opposite directions.

The level in the tank 54 is that which exists upstream from the gate, neglecting any loss of head in the conduit 55. The device is constructed to follow the first mode of operation described above, i. e., the changes in displacement of float members 50 and 51 do not appreciably affect the liquid levels in the tanks 53 and 54. If the level upstream from the gate falls, then the level in the tank 54 becomes lower than the level in pilot tank 53, the assembly turns in the direction of the arrow f, so as to move gate 43 toward its closed position. This movement continues as long as the upstream level, and hence the level in tank 54, remains lower than the level in tank 53. However, the closing movement of the gate tends to raise the upstream level, so that the closing movement is arrested as soon as the upstream level is restored to its selected value, i. e., equal to the level in tank 53. If the upstream level increases above that value, then the level in the tank 54 is greater than that in the tank 53, the assembly turns in the opposite direction, so as to open the gate until the upstream level is restored. When the levels in the tanks 53 and 54 are the same, the assembly is stable equilibrium in all positions. Consequently, the gate may assume any position required to maintain the upstream level, depending upon the conditions of water supply and demand.

Fig. 9 illustrates an apparatus constructed in accordance with the invention for controlling a gate in a canal to maintain the level downstream from the gate substantially constant.

The modification shown in Fig. 9 is analogous to that of Fig. 8, but the tank 54 functions as the pilot tank and is filled with water to a certain pilot level. The tank 53 is connected by conduit 56 of a convenient size to the canal at a sufficient distance downstream from the gate 43 so that the level is steady.

In this case the gate is operated by the oscillating assembly to maintain the level downstream substantially constant.

In the modifications shown in Figs. 8 and 9, the pilot level is attained by a certain volume of water having a predetermined level in one of the two tanks. When that construction is used, the pilot tank must have a volume sufficiently large so that the changes in displacement of the float member do not affect the level in the tank. Alternatively, the pilot level may be determined by a circulation of water over a weir in the pilot tank which determines the elevation of that pilot level. Such an arrangement permits the use of a smaller tank.

One may also determine the pilot level in the corresponding tank by connecting that tank either to a standpipe which forms an overflow weir and which is located at a suitable distance from the tank, or to any suitable point below the liquid level in a basin or other reservoir. The latter modification is illustrated schematically in Fig. 10. In that figure, the motor tank (not shown) is connected either to the upstream or downstream side of a gate in a canal according to one of the modifications illustrated in Figs. 8 or 9. The pilot tank 57 is connected by a conduit 59 to a reservoir or other capacity 59. The liquid level in the reservoir 59 determines the level in the tank 57, disregarding any loss of head in the conduit 58. Under these conditions, the gate controlled by the oscillating assembly regulates the downstream or upstream level to follow the variations of the level in the reservoir 59.

In other words, the level regulated has a value which follows closely the variations of an auxiliary level. This arrangement permits many interesting applications, especially with regard to the regulation of hydraulic installations having simple or multiple networks.

In the modifications shown in Figs. 8, 9 and 10 the oscillating assembly is illustrated as being of the type in which the stable equilibrium is obtained when the levels are equal in the pilot and motor tanks. It may be desirable in certain cases to utilize an apparatus which attains a stable equilibrium when a predetermined difference exists between the levels in the two tanks. To produce that effect, one may provide an apparatus which produces a constant supplementary couple, for example a counterweight suspended by a cable wound on a pulley concentric with the axis of oscillation, following a modification analogous to that shown in Fig. 3.

In Fig. 11, a gate 60 is controlled to maintain a constant level in the canal downstream from the gate, as long as the upstream level remains within a predetermined range of elevations. When the upstream level exceeds or falls below that range, it overrides the downstream level and controls the gate. The gate 60 is in the form of a cylindrical sector and is connected by arms 61 to a rod 62 which oscillates about a horizontal axis and is supported at its ends by knife edge bearings 63 resting on supports 64.

On the rod 62 are mounted two float members 65 and 66, which are concentric with the axis of oscillation of the rod 62. These float members 65 and 66 are truncated at their upper ends. The axis of oscillation is a line connecting the points of contact of the knife edges 63 with their supports 64 and is located substantially below the rod 62. A counterweight 67 is mounted on the rod 62 to balance the weight of the gate 60 and to compensate the effect produced by the truncation of the float members 65 and 66. The float members 65 and 66 are respectively partially immersed in two tanks 68 and 69. The tank 68, hereinafter referred to as the motor tank, is connected by a pipe 70 to the canal downstream from the gate 60. The tank 69 is hereinafter referred to as the pilot tank. A restricted conduit 71 connects the tanks 68 and 69, and a conduit 72 connects the tank 69 to the canal upstream from the gate 60. An overflow weir 73 is located in the tank 69 and is surmounted by a mask 74. A spillover 75 from the canal upstream from the gate 60 empties through a conduit 76 into the tank 69 behind the overflow weir 73. The weir 73 discharges into a chamber 77 provided with a spillover 78 and connected through a pipe 79 to the canal immediately below the gate, in a zone where the level of the water is lowered due to the velocity of the water passing through the gate.

In normal operation, when the upstream level is below the spillover 75, but is high enough so that the outlet of the pipe 70 is covered with water, the water circulates through pipe 72 into the tank 69 and thence over the weir 73 into the chamber 77 and is returned to the canal by pipe 79. The capacity of weir 73 is greater than that of pipe 72, so that a constant level is maintained in the pilot tank 69.

The level in tank 68 is the same as the downstream level. If any difference in level appears between tanks 68 and 69, due to variation in the downstream level, the assembly including float members 65 and 66 rotates about its axis in a sense to operate gate 60 to restore the downstream level to the same elevation as the level maintained in tank 69.

If the level upstream from the gate reaches the elevation of the spillover 75, the latter feeds the tank 69 which thereby receives an increased flow. The capacities of pipes 72 and 75 together are greater than that of weir 73, so that the level in tank 69 is raised above the lower edge of the mask 74. The elevation at which the apparatus maintains the downstream level is therefore raised along with the level in tank 69. The opening through the gate 60 for the passage of water is thereby increased, preventing the water from overflowing the canal upstream from the gate.

The spillover 78 acts to prevent the water from filling chamber 77 to an abnormal level and flooding the weir 73.

If the supply of water to the canal decreases and the upstream level falls, eventually the weir 73 no longer discharges into the chamber 77. The level in the pilot tank 69 then follows any further decrease in the upstream level. The elevation at which the apparatus maintains the downstream level is thereby decreased. The flow of water permitted by the gate is reduced, thereby conserving in the canal a greater proportion of the water which it receives.

If the reduction in the supply of water to the canal continues, eventually the level downstream from the gate falls enough to uncover the outlet of the pipe 70. The level in the motor tank 68 is then established to correspond with the elevation of the outlet of pipe 70. The connecting pipe 71 is effective to supply a continuous flow through the tank 68 under these conditions so as to maintain the level in that tank unaffected by the movements of the float member 65. The functions of the two float members 65 and 66 and their tanks 68 and 69 are now reversed. The float member 65 and tank 68 serve as a pilot and the float member 66 and tank 69 act as a motor to operate the gate so that the level in the tank 69 remains at the same level as the constant value established in the tank 68. The level upstream from the gate, is thereby established at a constant minimum elevation. The apparatus closes the gate if necessary, to prevent the upstream level from falling any further, and thereby prevents the drying up of the canal.

The danger of overflowing or draining of the canal is thereby prevented in the apparatus described. The maximum and minimum limits of the upstream level may be regulated by adjusting the elevations of the spillover 75 and of the pipe outlet 70 into the canal.

It should be understood that if the gate allows an excessive flow to pass into the downstream reach of the canal, the successive downstream gates will function in the same manner and the excess flow will be finally discharged into any suitable drain.

I claim:

1. Apparatus for producing a mechanical movement varying in accordance with the difference between two liquid levels, comprising first and second tanks, each containing a liquid at one of said levels; liquid level responsive means in each tank, comprising an element rotatable about a horizontal axis, a float member at least partially immersed and connected to said rotatable element for concurrent movement therewith, compensating means, and means including said float member and said compensating means for applying to said rotatable element a moment varying as a function of the level of the liquid in said tank and as a function of the angular position of said float member, said float member having a form of one-half of a solid of revolution truncated at one end, said compensating means and said float members cooperating to apply to said rotatable element a moment equivalent to that produced by a float member having the form of one-half of a solid of revolution and located so that said horizontal axis coincides with its axis of revolution; and a rotatable assembly including said float members, said rotatable elements and means connecting said elements for concurrent movement with the respective moment applying means in the two tanks acting in opposition to each other, so that variations of said moments due to changes in the angular positions of said float members are substantially balanced, and the net moment applied to said connecting means by the two moment applying means is determined substantially only by the difference between the liquid levels in the two tanks and is substantially unaffected by rotation of said assembly.

2. Apparatus for controlling a second liquid level, comprising first and second tanks, means for maintaining a constant first liquid level in said first tank, means for varying said second liquid level in the second tank and means for operating said level varying means including first and second arcuate-shaped float members immersed in the liquid of said first and second tanks, respectively, said arcuate-shaped float members being rigidly mounted on a common axis for concurrent rotatable movement, each arcuate-shaped float member being angularly positioned relative to the other so that the first float immersed in the liquid produces an opposing moment to the second float immersed in said second liquid, and connecting means attaching said float members to said level varying means for concurrent movement, said float members being effective when the liquid level in said second tank varies from a predetermined relation with respect to the level in said first tank to actuate said operating means to restore the level in said second tank to said predetermined relation.

3. Apparatus for producing a mechanical movement varying in accordance with the difference between two liquid levels, comprising first and second tanks adjacently located, each containing a liquid at one of said levels, a rod, means supporting said rod for pivotal movement about a horizontal axis extending transversely of said tanks, a float member at least partially immersed in each of said tanks, the immersed portion of each float member having the form of an arc of a solid of revolution, and a rotatable assembly including said rod, said float members and means connecting said float members to said rod with each member concentric about said axis so that the axis coincides with the axis of revolution of said members, said members being located in opposite angular relationships with respect to said axis, said float members being effective to apply to said rod opposed moments whose difference varies with the difference between the liquid levels in the two tanks and is substantially unaffected by rotation of said assembly.

4. Apparatus for producing a mechanical movement varying in accordance with variations in the difference between two liquid levels from a predetermined value, comprising first and second tanks adjacently located, each containing a liquid at one of said levels, a rod, means supporting said rod for pivotal movement about a horizontal axis extending transversely of said tanks, a pair of float members, each at least partially immersed in one of said tanks, the immersed portion of each float member having the form of an arc of a solid of revolution, a rotatable assembly including said rod, said float members, and means connecting said float members to said rod with each member concentric about said axis so that the axis coincides with the axis of revolution of said members, said members being located in opposite angular relationships with respect to said axis, said float members being effective to apply to said rod opposed moments whose difference varies with the difference between the liquid levels in the two tanks and is substantially unaffected by rotation of said assembly, and means for applying to said assembly an additional moment which is constant in all angular positions of the assembly, so that the assembly is in equilibrium only when the difference in levels is such that the difference between the opposed moments balances the additional moment.

5. Apparatus for producing a mechanical movement varying in accordance with the difference between two liquid levels, comprising first and second adjacently located tanks, each containing a liquid at one of said levels, a rod, means supporting said rod for pivotal movement about a horizontal axis extending transversely of said tanks above the liquid level therein, a pair of float members depending from said rod and each at least partially immersed in one of said tanks, each float member having the form of one-half of a solid of revolution truncated at one end, a rotatable assembly including said rod, said float members, and means connecting said float members to said rod, each member being concentric about said axis so that the axis coincides with the axis of revolution of said members, and means for counterbalancing said assembly to compensate for the truncation of said float members to maintain the center of gravity of the assembly substantially on said axis, said members being located in opposite angular relationships with respect to said axis, said float members being effective to apply to said rod opposed moments whose difference varies with the difference between the liquid levels in the two tanks and is substantially unaffected by rotation of said assembly.

6. Apparatus for producing a mechanical movement in accordance with a change in relative difference between two independent liquid levels, comprising first and second tanks containing liquid, an element rotatable about a horizontal axis and extending transversely of said tanks, a float member in each tank with the lower end immersed and having the form of an arc of an imaginary solid of revolution, each said float member being angularly located exclusively of the other within a respective complementary half of said solid of revolution, said float members being rigidly attached to said rotatable element for concurrent movement therewith, and means in each tank including said float members for applying to said rotatable element a moment equivalent to that produced by said complementary half of a solid of revolution rotating about the axis of said rotatable element, whereby the moment produced at each tank on the associated float member varies as a function of the associated liquid level and as a function of the angular position of the associated float member, said moments produced at the respective tanks acting in opposition to each other and the secondary net moment created by the angular positions of said float members being substantially balanced so that the primary net moment applied to said rotatable element by said two opposing moments produced at the respective tanks is determined substantially only by the difference between the liquid levels in the two tanks.

7. Apparatus as claimed in claim 6 wherein each said float member includes one-half of said imaginary solid of revolution.

8. Apparatus as claimed in claim 6 wherein said moment applying means in each tank is effective within a predetermined range of liquid levels and associated angular positions of said float member.

9. Apparatus as claimed in claim 8 that additionally includes stop means for limiting the rotation of said rotatable element.

10. Apparatus as claimed in claim 9 wherein said liquid levels are not appreciably changed by rotation of said floats so that said rotatable element continues after rotation starts until stopped by said limiting means.

11. Apparatus as claimed in claim 6 that additionally includes a load device to be positioned in accordance with said difference between liquid levels and a driving connection between said rotatable element and said load device.

12. Apparatus as claimed in claim 11 wherein said load device is a measuring element.

13. Apparatus as claimed in claim 11 wherein said load device is a flow controlling agent 14. Apparatus as claimed in claim 6 that additionally includes means effective upon rotation of said rotatable element to apply an additional moment varying directly with said rotation and being in opposition to said net moment whereby said rotatable element is rotated only through an angle proportional to a departure from predetermined liquid levels.

15. Apparatus as claimed in claim 14 wherein said additional moment means is a counterweight applying a rotational torque to said rotatable element.

16. Apparatus as claimed in claim 14, that additionally includes a scale, a pointer movable relative to said scale, and an operative connection between said rotatable element and said pointer so that the relative position of said pointer on said scale indicates the difference between said liquid levels.

17. Apparatus for maintaining a constant head across a flow restricting member during flow therethrough, comprising first and second tanks, a liquid at a different level in each said tank, a conduit connecting said tanks, a flow restricting member in said conduit, and an element rotatable about a horizontal axis and extending transversely of said tanks, a float member in each tank with the lower end immersed and having the form of an arc of an imaginary solid of revolution, each said float member being angularly located exclusively of the other within a respective complementary half of a given solid of revolution, said float members being rigidly attached to said rotatable element for concurrent movement therewith, means in each tank including said float members for applying to said rotatable element a moment equivalent to that produced by said complementary half of a solid of revolution rotating about the axis of said rotatable element, whereby the moment produced at each tank on the associated float member varies as a function of the associated liquid level and as a function of the angular position of the associated float member, and said moments produced at the respective tanks act in opposition to each other, the float member in one tank having a volume which is a substantial proportion of the tank volume so that changes in the position of the float member vary the level in said one tank, means in the other tank for maintaining a constant liquid level therein, and means for applying to said rotatable element an additional moment which is constant in all angular positions of said rotatable element so that the apparatus is in equilibrium only when the difference in levels has a predetermined value such that the net moment between the opposed moments produced at each tank balances said additional moment, said assembly being effective upon a change in said difference in levels from said predetermined value to rotate until said difference in values is restored to said level.

18. Apparatus as claimed in claim 17 that additionally includes a scale, a pointer movable over said scale, and an operative connection between said rotatable element and said pointer whereby the relative position of said pointer on said scale indicates a change in displacement in said one tank necessary to restore its level and thus a measure of the volume flow through said flow restricting member.

19. Apparatus as claimed in claim 18 that additionally includes a return conduit connecting said tanks, and a pump in said conduit for transferring liquid from the first into the second tank.

20. Apparatus as claimed in claim 19 that additionally includes a valve in said return conduit and a connection between the apparatus and the valve for operation of the valve.

21. Apparatus for producing a mechanical movement varying directly in accordance with the departure of a variable liquid level from a predetermined value comprising a first tank containing a liquid at said variable level, a second tank containing liquid, an element rotatable about a horizontal axis and extending transversely of said tanks, an elongated float member in each tank with the lower end immersed and having the form of an arc of an imaginary solid of revolution, each said float member being angularly located exclusively of the other within a respective complementary half of said solid of revolution, said float members being rigidly attached to said rotatable element for concurrent movement therewith, the float member in said second tank having a volume which is a substantial portion of the tank volume so that changes in the position of the float member vary the level in said second tank, and means in each tank including said float members for applying to said rotatable element a moment equivalent to that produced by said complementary half of a solid of revolution rotating about the axis of said rotatable element, whereby the moment produced at each tank on the associated float member varies as a function of the associated liquid level and as a function of the angular position of the associated float member, said moments produced at the respective tanks acting in opposition to each other and a change in level in said first tank causing a change in the angular position of said floats until the level in the second tank balances the change in level in the first tank.

22. Apparatus for controlling a liquid level, comprising first and second tanks containing liquid, means for maintaining a constant liquid level in said first tank, means for varying the liquid level in said second tank, an element rotatable about a horizontal axis and extending transversely of said tanks, a float member in each tank with the lower end immersed and having the form of an arc of an imaginary solid of revolution, each said float member being angularly located exclusively of the other within a respective complementary half of said solid of revolution, said float members being rigidly attached to said rotatable element for concurrent movement therewith, means in each tank including said float members for applying to said rotatable element a moment equivalent to that produced by said complementary half of a solid of revolution rotating about the axis of said rotatable element, whereby the moment produced at each tank on the associated float member varies as a function of the associated liquid level and as a function of the angular position of the associated float member, said moments produced at the respective tanks acting in opposition to each other and variations of said moments produced at the respective tanks due to changes in the angular positions of said float members being substantially balanced so that the net moment applied to said rotatable elements by said two opposing moments produced at the respective tanks is determined substantially only by the difference between the liquid levels in the two tanks, and means operatively connecting said rotatable element to said level varying means to restore the level in said second tank to said predetermined relation with respect to the constant level in said first tank when the liquid level in the second tank varies from said predetermined relation.

23. Apparatus for producing a mechanical movement in accordance with a change in relative difference between two independent liquid levels, comprising first and second tanks containing liquid, an element rotatable about a horizontal axis and extending transversely of said tanks, a displacement member in each tank with the lower end immersed and having the form of an arc of an imaginary solid of revolution, each said float member being angularly located exclusively of the other within a respective complementary half of said solid of revolution, said displacement members being rigidly attached to said rotatable element for concurrent movement therewith, and means in each tank including said displacement members for applying to said rotatable element a moment equivalent to that produced by said complementary half of a solid of revolution rotating about the axis of said rotatable element, whereby the moment produced at each tank on the associated displacement member varies as a function of the associated liquid level and as a function of the angular position of the associated displacement member, said moments produced at the respective tanks acting in opposition to each other and the secondary net moment created by the angular positions of said displacement members being substantially balanced so that the primary net moment applied to said rotatable element by said two opposing moments produced at the respective tanks is determined substantially only by the difference between the liquid levels in the two tanks.

References Cited in the file of this patent

UNITED STATES PATENTS

| 941,061 | Connet | Nov. 23, 1909 |
| 973,101 | Borden | Oct. 18, 1910 |
| 1,393,931 | Alger | Oct. 18, 1921 |
| 1,646,810 | Cook | Oct. 25, 1927 |
| 1,976,726 | House | Oct. 16, 1934 |
| 2,290,246 | Murphy | July 21, 1942 |

FOREIGN PATENTS

| 12,504 | Great Britain | May 28, 1908 |